US009158863B2

(12) United States Patent
Malec et al.

(10) Patent No.: US 9,158,863 B2
(45) Date of Patent: Oct. 13, 2015

(54) DATA ACQUISITION

(71) Applicant: HARRIS CORPORATION, Melbourne, FL (US)

(72) Inventors: Jeffrey M. Malec, Oregonia, OH (US); Zhiqun Hu, Liberty Township, OH (US); David C. Danielsons, Maineville, OH (US)

(73) Assignee: IMAGINE COMMUNICATIONS CORP., Frisco, TX (US)

( * ) Notice: Subject to any disclaimer, the term of this patent is extended or adjusted under 35 U.S.C. 154(b) by 173 days.

(21) Appl. No.: 13/712,308

(22) Filed: Dec. 12, 2012

(65) Prior Publication Data
US 2014/0160943 A1 Jun. 12, 2014

(51) Int. Cl.
H04L 12/66 (2006.01)
G06F 17/40 (2006.01)
G06F 11/30 (2006.01)

(52) U.S. Cl.
CPC ............ *G06F 17/40* (2013.01); *G06F 11/3058* (2013.01)

(58) Field of Classification Search
None
See application file for complete search history.

(56) References Cited

U.S. PATENT DOCUMENTS

| 4,189,769 | A | 2/1980 | Cook et al. | |
| 4,742,515 | A | 5/1988 | Dabholkar et al. | |
| 6,285,967 | B1* | 9/2001 | Rajan et al. | 702/188 |
| 6,349,274 | B1 | 2/2002 | Kay et al. | |
| 8,295,166 | B2 | 10/2012 | Woo | |
| 8,392,401 | B1* | 3/2013 | Aly et al. | 707/718 |
| 2003/0046339 | A1* | 3/2003 | Ip | 709/203 |
| 2005/0163121 | A1 | 7/2005 | Asano | |
| 2008/0066149 | A1 | 3/2008 | Lim | |
| 2008/0181252 | A1 | 7/2008 | Rofougarn | |
| 2009/0202102 | A1* | 8/2009 | Miranda et al. | 382/100 |
| 2014/0153399 | A1* | 6/2014 | Song | 370/238 |

FOREIGN PATENT DOCUMENTS

WO WO 2008/089013 A2 7/2008

* cited by examiner

*Primary Examiner* — Kevin C Harper
(74) *Attorney, Agent, or Firm* — Tarolli, Sundheim, Covell & Tummino LLP

(57) ABSTRACT

A data acquisition system can include a central controller to provide a data acquisition system signal. The data acquisition system can also include a cabinet to receive the data acquisition system signal. The cabinet can have an array of modules installed therein. The cabinet can include a backplane connected to each module of the array of modules. The backplane can provide a status request signal to a given module in the array of modules if the given module is assigned a module address identified by the data acquisition system signal. The given module can provide status data characterizing an operational status of the given module in response to the status request.

18 Claims, 7 Drawing Sheets

DATA ACQUISITION

TECHNICAL FIELD

This disclosure relates to data acquisition. More particularly, this disclosure relates to a data acquisition system for providing status data from a module.

BACKGROUND

Data acquisition is the process of sampling signals that measure real world physical conditions and converting resulting samples into digital numeric values that can be analyzed and/or manipulated by a computer. Data acquisition systems can, in some examples, convert analog waveforms into digital values for processing.

Data acquisition systems can include, for example a sensor that can convert physical parameters into electrical parameters. Data acquisition systems can also include signal conditioning circuitry to convert sensor signals into a form that can be converted into digital values as well as analog to digital converters (DACs) that can convert conditioned sensor signals to digital values.

SUMMARY

One example relates to a data acquisition system that can include a central controller to provide a data acquisition system signal. The data acquisition system signal can include a column address and a row address. The data acquisition system can also include a cabinet to receive the data acquisition system signal. The cabinet can have an array of modules installed therein. The cabinet can include a backplane connected to each module of the array of modules. The backplane can provide a status request signal to a given module in the array of modules if the given module is assigned a module address identified by the data acquisition system signal. The given module can provide status data characterizing an operational status of the given module in response to the status request.

Another example relates to a data acquisition system that can include a central controller to provide a data acquisition system signal for each module in an array of modules. Each data acquisition system signal can include a column address identifying a specific column of modules in the array of modules, a row address identifying a specific row of modules in the array of modules and a cabinet address identifying a specific cabinet in an array of cabinets. The array of cabinets can receive the data acquisition system signal, each cabinet can have a proper subset of the array of modules installed therein, such that at least two of the modules in the array of modules are assigned an address with the same row and the same column. A given cabinet in the array of cabinets can include a cabinet interface to provide only the column address and the row address of the data acquisition system signal if the cabinet address of the data acquisition system signal identifies an address assigned to the given cabinet. A backplane can be connected to each module in the proper subset of the array of modules installed in the given cabinet. The backplane can receive the column address and the row address of the data acquisition system signal. The backplane can also provide a status request signal to a given module in the proper subset of array of modules installed in the given cabinet if the given module is assigned a module address identified by the column address and the row address of the data acquisition system signal. The given module can provide status data characterizing an operational status of the given module in response to the status request.

Figure 7:
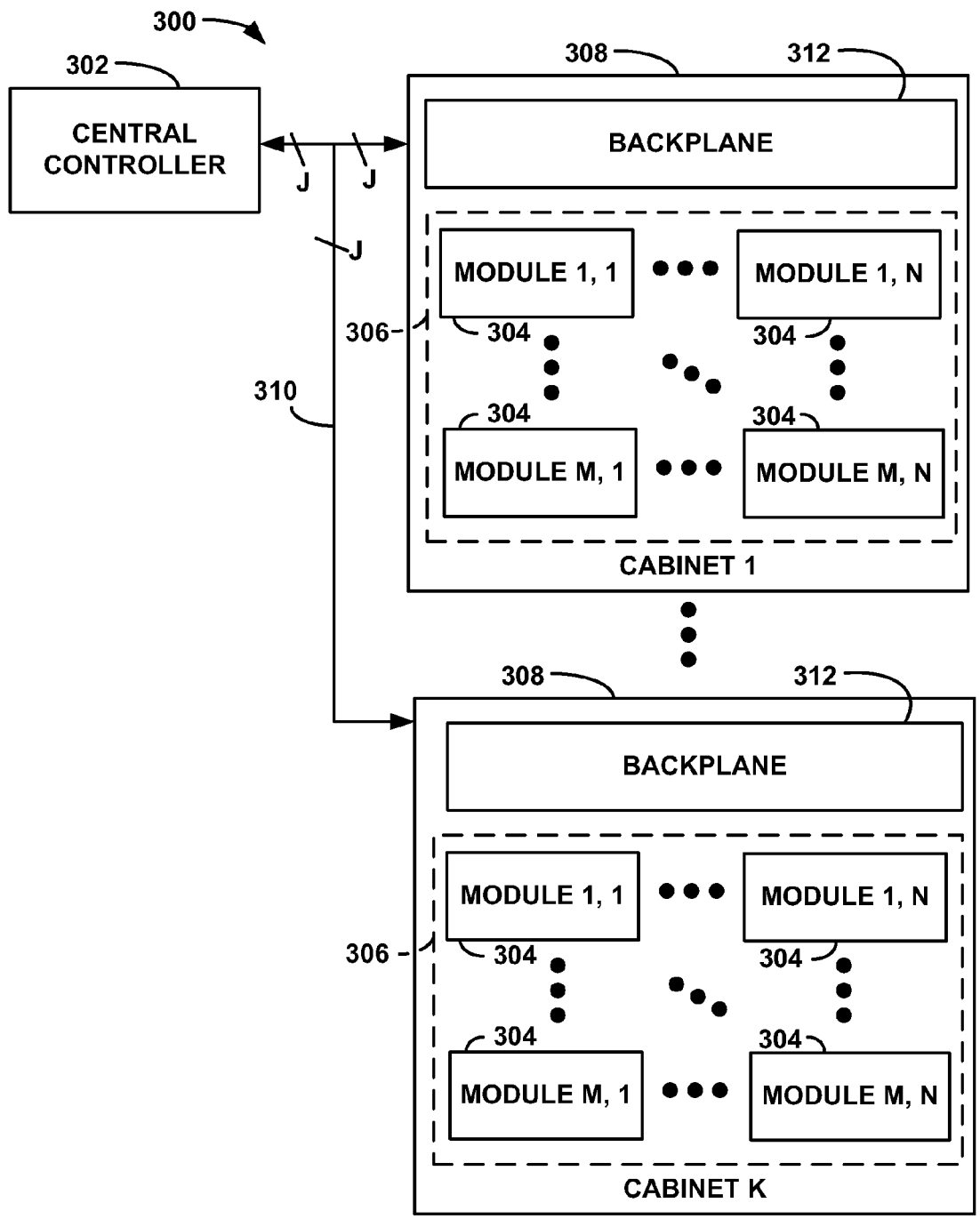
FIG. 7 illustrates still yet another example of a data acquisition system.

FIG. 7 illustrates still yet another example of a data acquisition system. The data acquisition system can include a central controller to provide a data acquisition system signal to each module in an array of modules. Each data acquisition system signal can include a module address identifying a given module in the array of modules. A ribbon cable can connect the central controller to each cabinet in an array of cabinets. The array of cabinets can receive the data acquisition system signal via the ribbon cable. Each cabinet can have a proper subset of the array of modules installed therein. A given cabinet of the array of cabinets can include a backplane connected to each module in the proper subset of the array of modules installed in the given cabinet. The backplane can provide a status request signal to the given module in the array of modules if the given module is installed in the given cabinet. The given module can provide status data characterizing an operational status of the given module in response to the status request.

DETAILED DESCRIPTION

This disclosure relates to a data acquisition system wherein a central controller can provide a data acquisition system signal to a plurality of cabinets (e.g., electrical racks) that can house an array of modules (e.g., electronic modules). The data acquisition system signal can identify a specific module in the array of modules. Moreover, each cabinet can analyze the data acquisition system signal to identify the specific module. Upon identification of the specific module, the specific module can be sent a status request signal. In response to the status request signal, the specific module can provide status data that characterizes operational conditions of the specific module. The data acquisition system signal and the status data can be multiplexed such that a relatively large number of modules can be implemented in the array of modules, while only needing a relatively simple ribbon cable to connect the central controller to each of the plurality of cabinets. As used herein, the term "data acquisition system signal" can include all signals provided on the ribbon cable (or other parallel bus), which can include, but are not limited to acquisition signals (signals to be acquired), an address/selection signal (which can be grouped in multiple ways, such as by cabinet, row, column, etc.), and a control signal. Employment of this system allow as an efficient addressing of the modules in the array of modules and reduction of cable clutter. Additionally, since each module would need to only include basic logic for determining the status data (which status data can be provided as an acquisition signal in a manner described herein), relatively little configuration of each individual module is needed. Employment of the ribbon cable can address a large set of modules with a relatively simple control module and minimal logic as compared to a system that requires a serializing/deserializing of data at a control module and module locations with equal or better response times.

Figure 1:
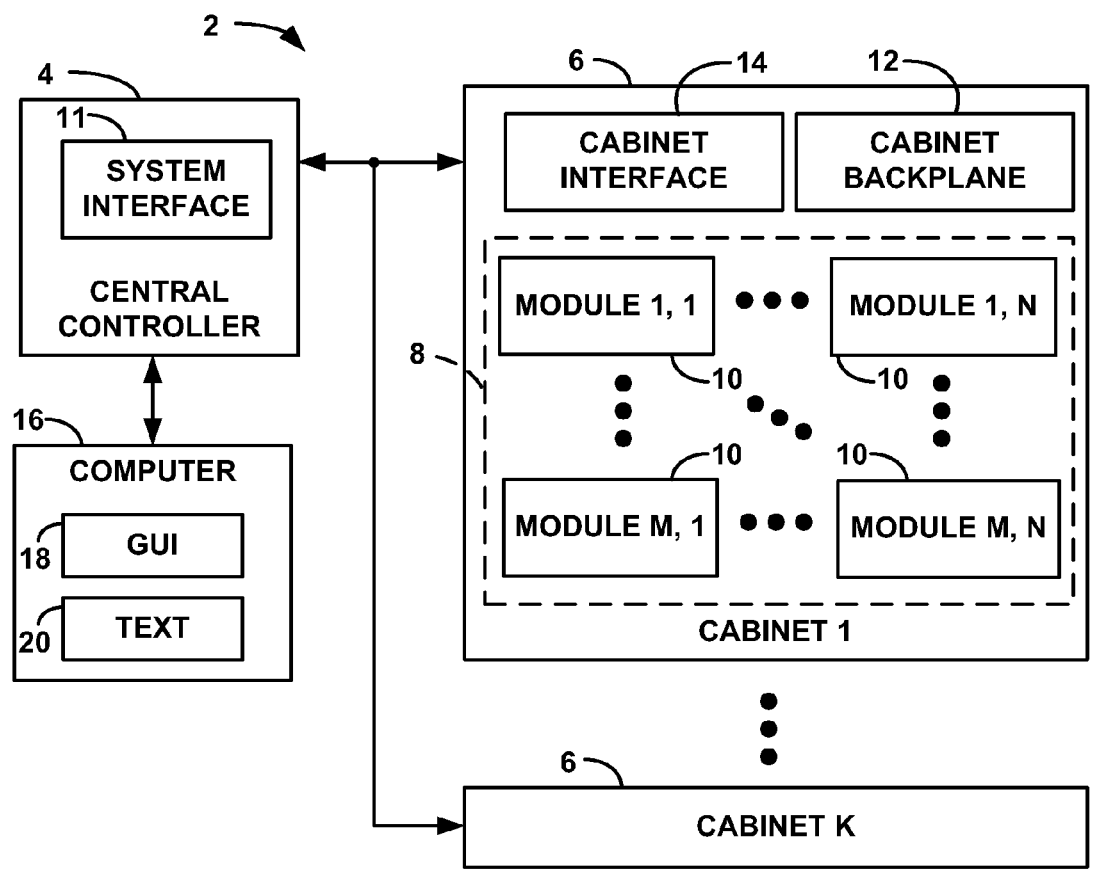
FIG. 1 illustrates an example of a data acquisition system.

FIG. 1 illustrates an example of a data acquisition system 2. The system 2 can include a central controller 4 that can communicate with K number of cabinets 6, where K is an integer greater than or equal to one. The central controller 4 can be implemented, for example, as a microprocessor, a microcontroller, a standalone computer, etc. Each of the K number of cabinets 6 (e.g., electrical racks) can be implemented as a standardized frame or enclosure to mount multiple modules 10, such as electrical equipment modules. In some environments of application, each of the K number of cabinets 6 can house modules 10 for communicating over radio frequency (RF) channels, such as a RF transmitter, an RF receiver and/or a power amplifier.

Cabinet 1 of the K number of cabinets 6 (labeled n FIG. 1 as "CABINET 1") can house an array of modules 8. In some examples, the array of modules 8 can be a two-dimensional array of modules 8. For instance, in one example, there can be M×N number of modules 10 house in the cabinet 1, where both M and N are integers greater than or equal to one. Each of the modules 10 can communicate over a cabinet backplane 12 that can be implemented, for example, as a printed circuit board with slots that can receive the modules 8. The cabinet backplane 12 can be designed with a bus (e.g., a group of wires) that interconnects each of the modules 8. In some examples, the array of modules 8 can span multiple cabinets 6, such that two modules 10 can have the same column and row, but be installed in different cabinets 6. In the present example, each module 10 in cabinet 1 can be uniquely identified by a column and row.

Each of the modules 10 can be configured to perform a particular function. For instance, in one example module 1, 1 could be implemented as a power amplifier, while module 1, N could be implemented as an RF receiver and module M, 1 could be implemented as an RF transmitter. Moreover, in some examples, the modules 10 could be implemented to perform multiple tasks. Each module 10 can be configured to provide status data to the central controller 4. The status data can indicate health and/or operational status of a given module 10. For instance, in some examples, the status data can be indicative of fault status, operational temperature, operational power (e.g., current and/or voltage measurements), etc. Each of the modules 10 can be implemented, for example, with nearly any number and type of electrical components.

Each module 10 can be configured to provide the status data via the cabinet backplane 12 and a cabinet interface 14 to the central controller 4. The cabinet interface 14 could be implemented, for example, as a controller with a communications port (e.g., a parallel port, a serial port, etc.) that can communicate with the central controller 4. In some examples, the central controller 4 can be coupled to each of the K number of cabinets 6 through a single ribbon cable. In some examples, the ribbon cable can have 40 conductors, but in other examples, the ribbon cable can be nearly any size.

Each module 10 in each cabinet 6 can have a unique address. For instance, in examples where there is only 1 cabinet 6 employed, a given module 10 can have an address corresponding to the given module's 10 position in cabinet 1. As one example, module 1, 1 can have an address of (1,1), while module M, N can have an address of (M,N). In this manner, the central controller 4 can directly address each module 10 in the array of modules 8. Moreover, in other examples, such as situations where there is more than one cabinet 6, a given module can still have a unique address corresponding to the given module's cabinet 6 and the given module's position within the associated cabinet 6. As one example, module 1, 1 in cabinet 1 can have and address of (1,1,1), while module M, N in cabinet 1 can have an address of (1,M,N). Similarly, module 2, 3 in cabinet K 6 could have an address of (K, 2, 3). Thus, the central controller 4 can still uniquely address each module 10 in each array of modules 8 in each of the K number of cabinets 6.

Additionally, the central controller 4 can include a system interface 11 that can be implemented with a circuit similar to the cabinet interface 14. In such a situation, the system interface 11 can include a bidirectional data switch that passes address data to the K number of cabinets 6. Further, in some examples, the central controller 4 can be assigned a unique address of '0', such that the central controller 4 can gather information about itself in a manner described herein.

In some examples, the unique address of each module 10 in each cabinet 6 can be set on the corresponding cabinet backplane 12. For instance, in some examples, each cabinet backplane 12 can include a set of dip switches that can assign module addresses to associated slots in the associated cabinet 6, and a given module 10 can be installed in a given slot. For purposes of simplification of explanation, in the present examples, it is presumed that the module address assigned to the given slot corresponds to a position within the corresponding cabinet 6 in a manner described above. However, is to be understood that in other examples, different techniques for addressing can be employed.

In some examples, the central controller 4 can provide a data acquisition system signal that includes an identifier (e.g., an address signal) of a given cabinet address and a given module address to each cabinet interface 14 in the K number of cabinets 6. In one example, each cabinet interface 14 can determine if the given cabinet address corresponds to its cabinet address. For instance, upon receiving the data acquisition system signal, the cabinet interface 14 of cabinet 1 can determine if the given cabinet address in the data acquisition system signal is 1. In such a situation if the given cabinet address and the data acquisition system signal is 1, the cabinet interface 14 of cabinet 1 can forward the data acquisition system signal that identifies the given module 10 to the cabinet backplane 12, while (in some examples) not forwarding (e.g. blocking) the given cabinet address in the data acquisition system signal. The cabinet backplane 12 can employ the data acquisition system signal to open a channel between a given module 10 in the array of modules 8 with the given module address and the central controller 4. In some examples, to open the channel, the cabinet backplane 12 can close a switch associated with the given module 10. Additionally or alternatively, the cabinet backplane 12 can provide the given module address to a demultiplexer (DEMUX) and provide a status request signal to the given module 10 from the DEMUX to the central controller 4.

Upon opening the channel, the given module 10 can provide status data to the central controller 4 via the cabinet backplane 12 and the cabinet interface 14. Moreover, the cabinet interface 14 can forward the status data to the central controller 4. The central controller 4 can analyze the status data and provide another data acquisition system signal to acquire status data for the given module 10 or another module 10. In some examples, the central controller 4 can send the data acquisition system signals for each of the M×N modules 10 in a sequential order and receive the status data from each of the M×N modules 10 in the same sequential order. Moreover, upon acquisition of the status data, the central controller 4 can analyze the status data from each module 10 to facilitate a monitoring system. For instance, the central controller 4 can be coupled to a computer 16 that can display a graphical user interface (GUI) 18 and/or text 20 (e.g., an alpha numeric display) such that a user can view the status of each module 10 in the cabinet in the system 2.

Additionally or alternatively, in some examples, the central controller 4 can provide a control signal to each of the M×N modules 10, or some subset thereof. The control signal can include a control command that can cause a given module to execute a particular command. In this manner, the central controller 4 can control the operations of the M×N modules 10.

By employing the system 2, a relatively simple, low-cost array of modules 8 can be realized. Each module 10 would only need to include minimal logic and circuitry for acquiring and providing status data. For instance, in some examples, a module 10 can be implemented as with a digital multi-meter and discrete logic addressing. In one examples, a module 10 may be implemented with a network of dip switches and discrete circuit components (e.g., a light emitting diode). Moreover, in some examples, each of the K number of cabinets 6 can communicate with the central controller 4 via the same ribbon cable, which can reduce the complexity of the wiring that couples the central controller 4 to each of the cabinets 6. Moreover, since the address for each module 10 can be set by the cabinet backplane 12, upon failure of a given module 10, the given module 10 would be replaceable with minimal or no configuration effort, thus reducing maintenance costs of the system 2.

Further, the system 2 can be implemented with a relatively low data rate connection between the central controller 4 and the K number of cabinets 6. For instance, by employing a 1 kilohertz (1 KHz) data rate, status data from each of the modules 10 can be collected at a rate of about 10 milliseconds per sample (or 100 samples per second). By employment of the relatively slow data rate (e.g., about 1 KHz), line noise can and costs be reduced.

Figure 2:
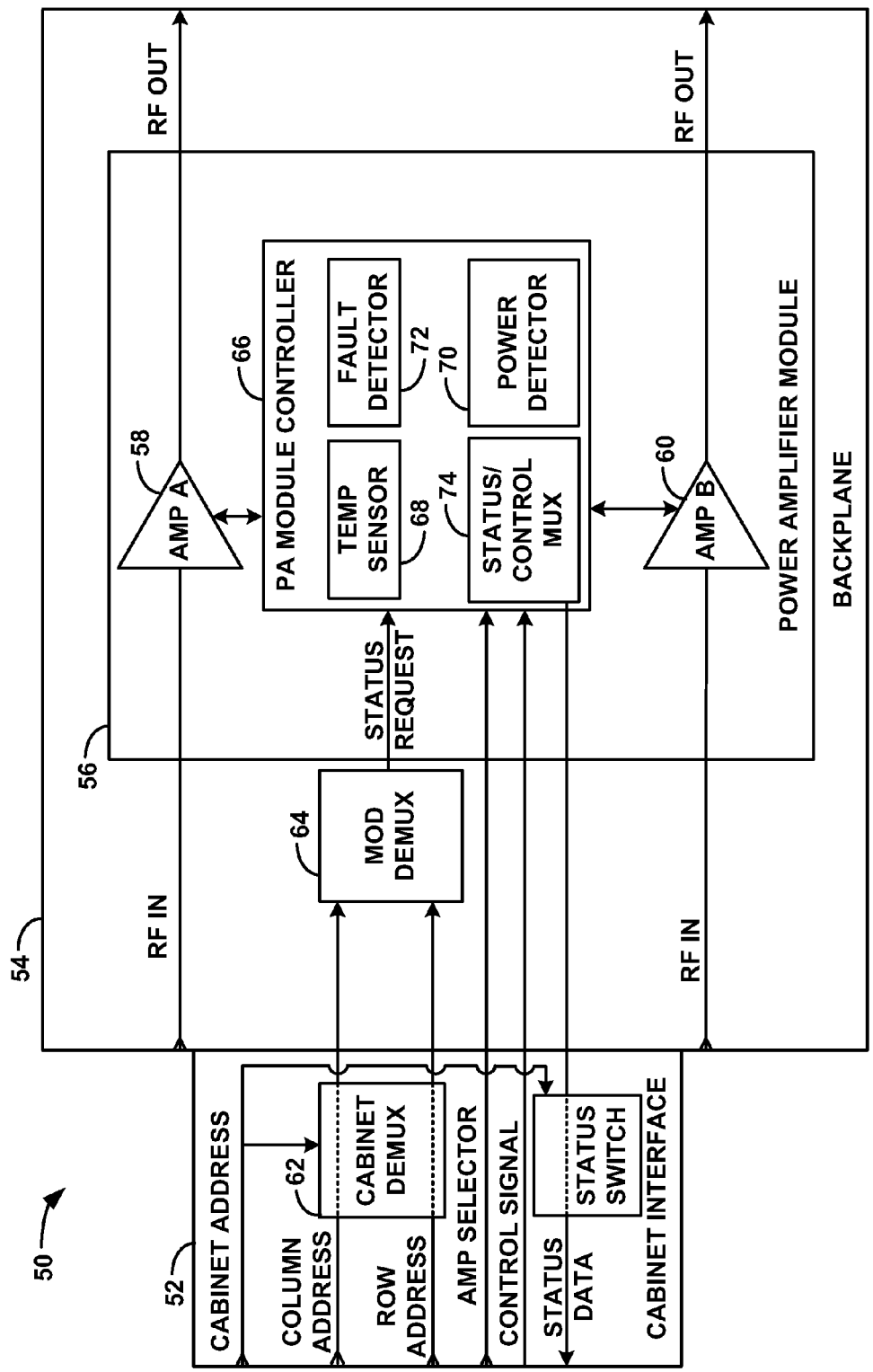
FIG. 2 illustrates another example of a cabinet for a data acquisition system.

FIG. 2 illustrates an example of a portion of cabinet 50 (e.g., cabinet 6 illustrated in FIG. 1). The cabinet 50 can include a cabinet interface 52 that can communicate with a central controller (e.g., the central controller 4 illustrated in FIG. 1) through a ribbon cable. The cabinet 50 can also include a backplane 54 (e.g., the cabinet backplane 12 illustrated in FIG. 1) electrically coupled to a power amplifier module 56, which could be employed to implement one of the modules 10 illustrated in FIG. 1). The power amplifier module 56 can be considered to be installed in a slot of the cabinet 50. In the present example, for purposes of simplification of explanation, it is presumed that the power amplifier module 56 is installed in slot column 1, row 1 of cabinet 1, such that the power amplifier module 56 has an address of (1,1,1).

The power amplifier module 56 can be implemented as a dual power amplifier module, with the power amplifier A 58 (labeled in FIG. 2 as "AMP A") and the power amplifier B 60 (labeled in FIG. 2 as "AMP B"). The power amplifier A 58 and the power amplifier B 60 can each receive an RF input signal (labeled in FIG. 2 as "RF IN"). The RF input signal provided to the power amplifier A 58 can be the same or a different RF input signal provided to the power amplifier B 60. The power amplifier A 58 and the power amplifier B 60 can provide an RF output signal (labeled in FIG. 2 as "RF OUT") that can be an amplified version of the corresponding RF input signal.

The backplane 54 can receive a data acquisition system signal from a cabinet interface 52. The data acquisition system signal can originate from the central controller 4. The data acquisition system signal can include, for example, a cabinet address signal (labeled in FIG. 2 as "CABINET ADDRESS", a column address signal (labeled in FIG. 2 as "COLUMN ADDRESS", a row address signal (labeled in FIG. 2 as "ROW ADDRESS"), an amplifier selector signal (labeled in FIG. 2 as "AMP SELECTOR") and a control signal (labeled in FIG. 2 as "CONTROL SIGNAL"). In other examples, the data acquisition system signal can include more or less signals.

The cabinet interface 52 can include a cabinet DEMUX 62 that can receive the cabinet address signal, the column address signal and the row address signal of the data acquisition system signal. The cabinet DEMUX 62 can include a cabinet address encoded therein. The cabinet DEMUX 62 can be configured such if the cabinet address signal identifies the cabinet address encoded in the cabinet DEMUX 62, the column address signal and the row address signal of the data acquisition system signal can be provided to a module DEMUX 64 of the backplane 54 (labeled in FIG. 2 as "MOD DEMUX"). Additionally, the cabinet interface 52 can provide the amplifier selector signal and the control signal to the backplane 54.

The backplane 54 can provide the amplifier selector and the control signal to a power amplifier module controller 66 of the power amplifier module 56. The power amplifier module controller 66 can be implemented, for example, as a microcontroller, a logical gate array, a field programmable logic controller (FPGA), etc. The power amplifier module controller 66 can receive input signals from the power amplifier A 58 and the power amplifier B 60. In some examples, the input signals provided from the power amplifier A 58 and the power amplifier B 60 can be analog signals or digital signals that can provide real-time status data related to operation of the respective power amplifier.

The module DEMUX 64 of the backplane 54 can be configured to provide a status request signal to the power amplifier module 56 in response to receiving a column address signal and a row address signal that identifies the power amplifier module 56. For instance, as noted, it is presumed that the power amplifier module 56 has an address of (1,1,1) indicating that the power amplifier module 56 is seated in column 1, row 1 of cabinet 1. Moreover, since, in the present example, the backplane 54 does not receive the cabinet address signal, the module DEMUX 64 can be controlled with only the column address signal and the row address signal of the data acquisition system signal. Thus, if the column address signal identifies column 1 and the row address signal identifies row 1, the status request signal (labeled in FIG. 2 as "STATUS REQUEST") can be provided to the power amplifier module controller 66 from the module DEMUX 64.

In response to the status request signal and the amplifier selector signal, the power amplifier module controller 66 can employ the input signal provided from the amplifier identified by the amplifier selector signal (power amplifier A 58 or power amplifier B 60) to determine status data for the identified amplifier.

In one example, the power amplifier module controller 66 can include a temperature sensor 68 that can determine an operating temperature of the identified amplifier, which can be referred to as operational temperature. The temperature sensor 68 can be implemented, for example, as a thermistor. Additionally or alternatively, the power amplifier module controller 66 can include a power detector 70 that can determine an amount of power employed at a given point in time by the identified power amplifier, which can be referred to as operational power. In such a situation, the power detector 70 can include a voltage and/or a current meter. Yet further, the power amplifier module controller 66 can include a fault detector 72 that can detect whether or not the identified amplifier has a fault which can be referred to as a fault status. For instance, the fault detector 72 can include logic circuitry for determining if the amount of power employed by the identified power amplifier is above or below a certain threshold and/or if the operational temperature of the identified power amplifier is above a certain threshold. The operational temperature, the operational power and the fault status can be provided to a status/control multiplexer (MUX) 74. The status/control MUX 74 can provide the status data that includes the operational temperature, the operational power and the fault status for the identified power amplifier. The status data can be provided to the backplane 54, such that the backplane 54 can provide the status data to the cabinet interface 52. The status data can be received at a status switch of the cabinet interface 52. The status gate can be configured to connect the status data to the central controller if the address indicated by the cabinet address of the data acquisition system signal is correct, such that the cabinet interface 52 can provide the status data to the central controller, and avoiding conflicts with other cabinets. The status switch can include, for example, digital control logic for controlling a digital portion of the status data and buffers for controlling an analog portion of the status data.

Additionally or alternatively, in some examples, the status/control MUX 74 can receive the control signal. In such a situation, the control signal can include a control command that can be executed by the status/control MUX 74, for instance to control amplifier A 58 and/or amplifier B 60. In this manner, the power amplifier module 50 can be remotely controlled from the central controller.

Figure 3:
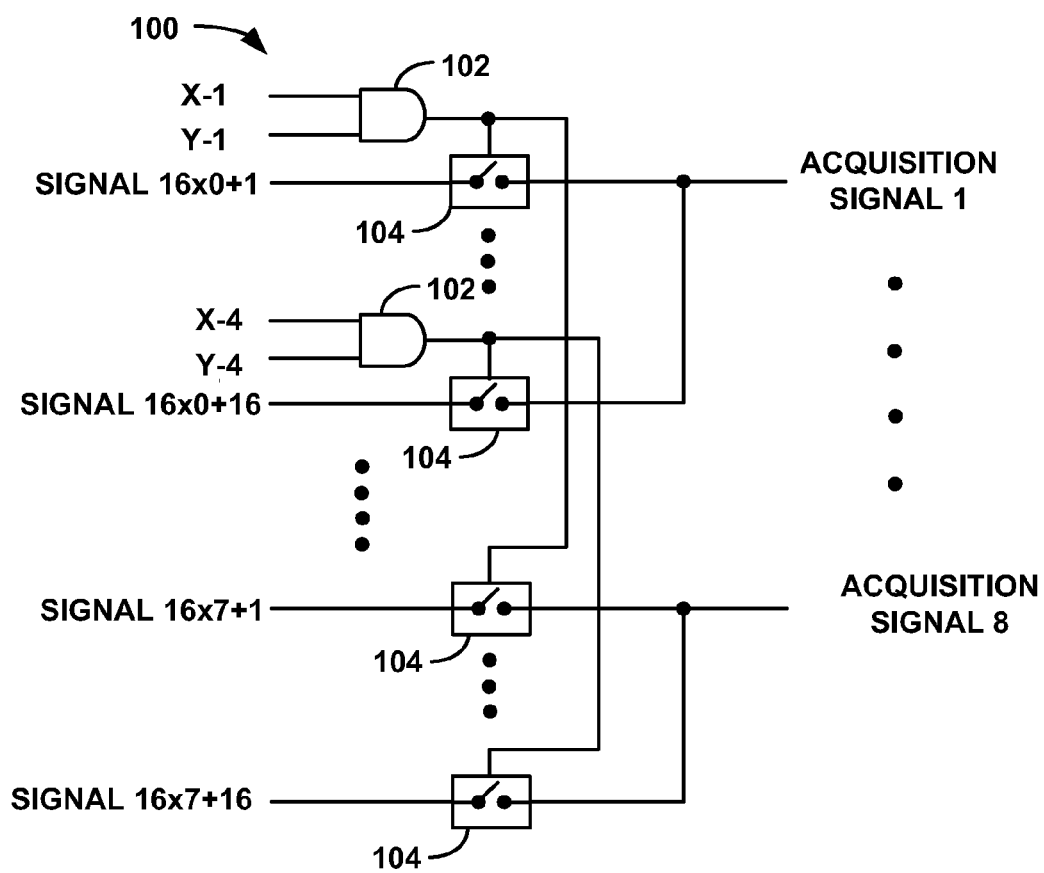
FIG. 3 illustrates an example of a multiplexing system that can be employed in a data acquisition system.

FIG. 3 illustrates an example of a multiplexing system 100 with components and signals that can be employed to implement one of the cabinets 6 illustrated in FIG. 1 and/or the cabinet 50 illustrated in FIG. 2. In the present example, it is presumed that the cabinet can house up to 16 different modules, in a 4×4 array of modules. However, in other examples, a different number (and non-symmetric) array of modules could be housed by the cabinet. In the present example, the multiplexing system 100 can include 16 two-address AND gates 102 that could be implemented, for example, in a module DEMUX (e.g., the module DEMUX 64 illustrated in FIG. 2). The output of each AND gate 102 can control 8 switches 104. Although the present example employs AND gates 102, in other examples, different gates and/or switches can be employed to perform a similar function.

Each of the AND gates 102 can receive two address signals that identify a unique column and a unique row of the array of modules. The two address signals can be implemented as X, Y coordinates. In the present example, four address wires (lines) can be assigned as X coordinates, while four address wires (lines) can be assigned as Y coordinates. Thus, there can be 16 unique combination of a one X wire and one Y wire. Table 1 lists the unique combinations of X and Y wires that can be employed to address a given module of the array of modules.

TABLE 1

| Signal Group Selected | Selection | Y4 | Y3 | Y2 | Y1 | X4 | X3 | X2 | X1 |
|---|---|---|---|---|---|---|---|---|---|
| 1 | Y1X1 | 0 | 0 | 0 | 1 | 0 | 0 | 0 | 1 |
| 2 | Y2X1 | 0 | 0 | 1 | 0 | 0 | 0 | 0 | 1 |
| 3 | Y3X1 | 0 | 1 | 0 | 0 | 0 | 0 | 0 | 1 |
| 4 | Y4X1 | 1 | 0 | 0 | 0 | 0 | 0 | 0 | 1 |
| 5 | Y1X2 | 0 | 0 | 0 | 1 | 0 | 0 | 1 | 0 |
| 6 | Y2X2 | 0 | 0 | 1 | 0 | 0 | 0 | 1 | 0 |
| 7 | Y3X2 | 0 | 1 | 0 | 0 | 0 | 0 | 1 | 0 |
| 8 | Y4X2 | 1 | 0 | 0 | 0 | 0 | 0 | 1 | 0 |
| 9 | Y1X3 | 0 | 0 | 0 | 1 | 0 | 1 | 0 | 0 |
| 10 | Y2X3 | 0 | 0 | 1 | 0 | 0 | 1 | 0 | 0 |
| 11 | Y3X3 | 0 | 1 | 0 | 0 | 0 | 1 | 0 | 0 |
| 12 | Y4X3 | 1 | 0 | 0 | 0 | 0 | 1 | 0 | 0 |
| 13 | Y1X4 | 0 | 0 | 0 | 1 | 1 | 0 | 0 | 0 |
| 14 | Y2X4 | 0 | 0 | 1 | 0 | 1 | 0 | 0 | 0 |
| 15 | Y3X4 | 0 | 1 | 0 | 0 | 1 | 0 | 0 | 0 |
| 16 | Y4X4 | 1 | 0 | 0 | 0 | 1 | 0 | 0 | 0 |

An output signal of each of the 16 AND gates 102 can be provided as a status request signal to an associated module. In the present example, each module can be represented as the 8 different switches 104 that each receives a signal from an associated module controller (e.g., the power amplifier module controller 66 illustrated in FIG. 2). Moreover, when both of the address signals to the corresponding AND gate 102 is a logical '1', each of the 8 switches 104 close, thereby providing 8 corresponding acquisition signals (e.g., signals to be acquired that are provided in response to the address signals). The acquisition signals can include an analog signal and/or a status signal in a digital format (e.g., a binary signal). For instance, in FIG. 3, the signal labeled as SIGNAL 16×0+1 can be implemented as a wire 1 provided from module 1, 1 in the array of modules. In the present example, each module controller can provide up to 8 different acquisition signals on 8 different wires. Thus, module 1, 1 can provide SIGNALS 16×0+1 through 16×7+1, in response to a logical '1' being provided on wires X-1 and Y-1, as acquisition signals (labeled in FIG. 3 as "ACQUISITION SIGNALS 1-8") that can employed to implement the status data described in FIGS. 1 and 2. A given set of the 8 acquisition signals can be referred to as a group of acquisition signals. Accordingly, the 8 address signals (X1-X4 and Y1-Y4) can be employed to select a set of 8 acquisition signals. In a similar fashion each of the other fifteen modules can also provide a group of 8 acquisition signals. Moreover, although the present example illustrates 8 acquisition signals in each group of acquisition signals, in other examples, more or less acquisition signals can be provided in each group of acquisition signals. It is noted that each group of acquisition signals can be digital signals, analog signals or a combination thereof. Further, it is noted that in the present example, 16 acquisition signals (1 acquisition signal for each of the 16 groups of acquisition signals) are provided on the same data wire (line), since only the acquisition signal of a single selected group would be active at any one time. Accordingly, the central controller can receive all acquisition signals provide by modules from the same group of conductors on a ribbon cable. This can significantly reduce the number of wires needed to couple the cabinet backplane to the backplane interface and to the central controller.

The multiplexing system 100 can be scaled to accommodate a larger or smaller number of modules. In the present example, for a given number of address signals (provided to the cabinet backplane), A, a maximum number of different groups of acquisition signals, D can be provided. Equation 1 defines the relationship between the A and D.

$$D = 2^{\frac{A}{2}}; \qquad \text{Equation 1}$$

Wherein:
  A is the number of address signals; and
  D is the maximum number of different groups of acquisition signals.

For instance, in the above example, there are a total of 8 address signals (X1-X4 and Y1-Y4) and there are 16 groups of acquisition signals. Table 2 includes a list of several possible relationships between A and D.

TABLE 2

| Address Signals (A) | Maximum Data Groups (D) |
| --- | --- |
| 4 | 4 |
| 8 | 16 |
| 16 | 256 |
| 20 | 1024 |

As noted with respect to FIG. 1, in some examples, a 40-conductor ribbon cable can be employed to connect the central controller to each of the cabinets. In such a situation, by allocating 16 conductors to acquisition signals (provided to the central controller) and 16 conductors to address signals (provided to the cabinet backplane), a total of 256 unique groups of acquisition signals can be can be provided to the central controller, where there are 8 acquisition signals in each group of acquisition signals (2048 total acquisition signals). Thus, with employment of a single 40-conductor ribbon cable to connect the central controller to each of the cabinets, up to 256 modules (e.g., the module 10 illustrated in FIG. 1 and/or the power amplifier module 56 illustrated in FIG. 2) can be uniquely addressed and accommodated.

Figure 4:
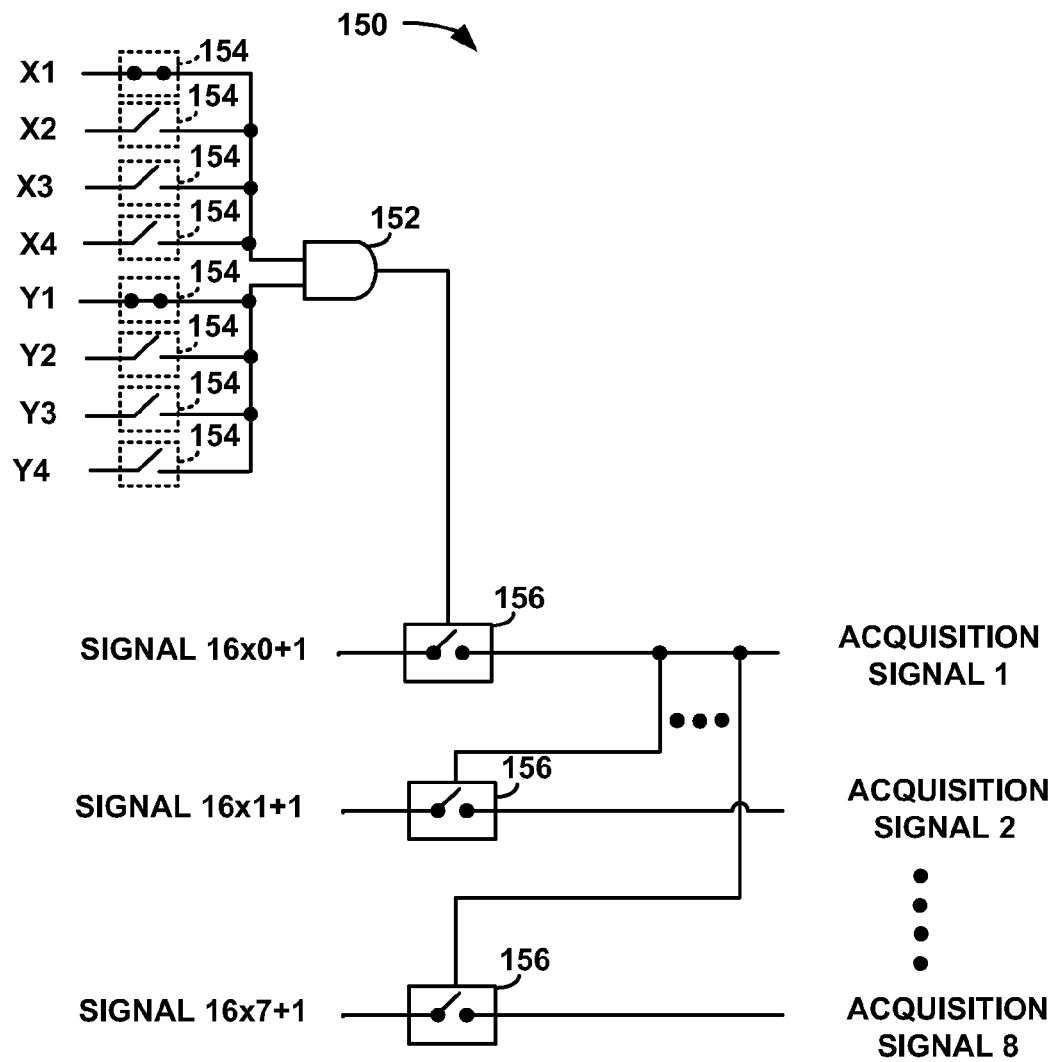
FIG. 4 illustrates an example of an input/output (I/O) interface that can be employed in a data acquisition system.

FIG. 4 illustrates an example of an input/output (I/O) interface 150 that can be employed, at each AND gate 102 in the multiplexing system 100 illustrated in FIG. 3. The I/O interface 150 can include an AND gate 152 coupled to 8 different address wires, X1-X4 and Y1-Y4. The I/O interface 150 can include a dip switch 154 at each address wire (line). To set the address of a slot with a module installed (represented as a plurality of switches 156), one of the dip switches 154 associated with wire X1-X4 can be closed as well as one of the dip switches 154 associated with Y1-Y4. By closing a particular pair of dip switches 154, an address for an associated slot can be set, where the module can be installed in the slot. For instance, in the present example, the dip switches 154 that receive wires X1 and Y1 are closed, thus setting the module address to 1, 1. In the present example, there are 16 different possible combinations of pairs dip switches 154. Upon receiving a logical '1' at wires X1 and Y1, the plurality of switches 156 can be closed thereby passing SIGNALS 16×0+1 through 16×7+1 as ACQUISITION SIGNALS 1-8 in a manner described herein.

Figure 5:
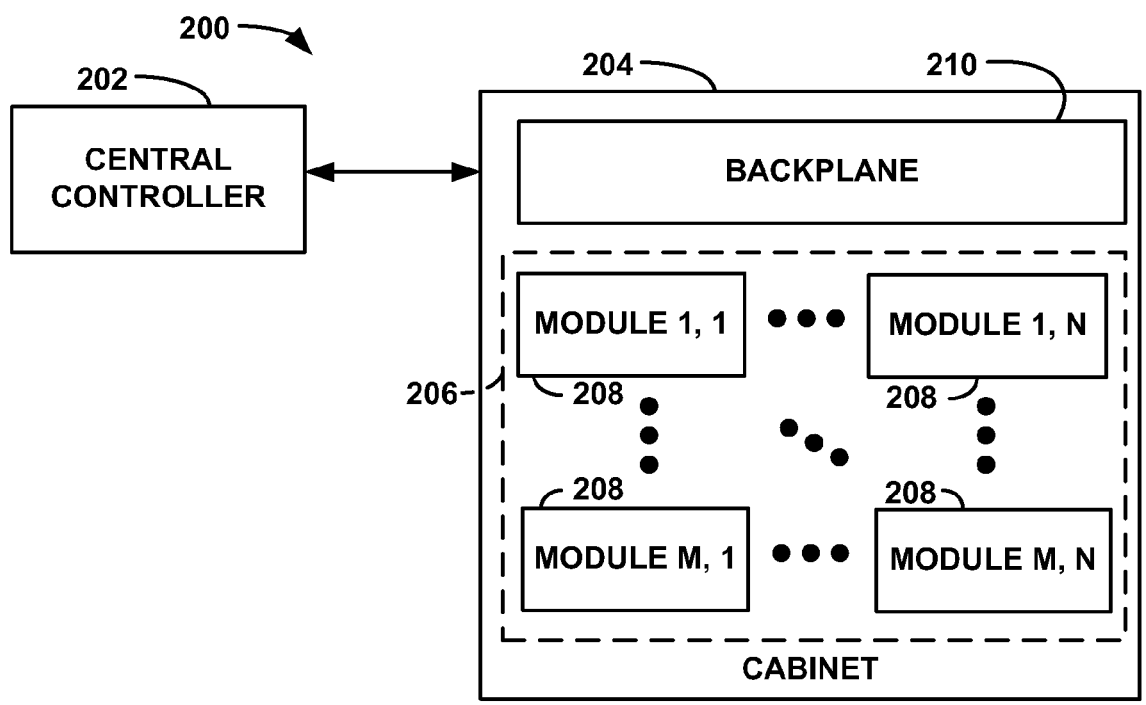
FIG. 5 illustrates another example of a data acquisition system.

FIG. 5 illustrates another example of a data acquisition system 200. The data acquisition system 200 can include a central controller 202 to provide a data acquisition system signal. The data acquisition system signal can include a column address and a row address. The data acquisition system 200 can also include a cabinet 204 to receive the data acquisition system signal. The cabinet 204 can have an array of modules 206 installed therein. In one example, there can be M×N number of modules 208 in the array of modules. The cabinet 204 can include a backplane 210 connected to each module 210 of the array of modules 206. The backplane can to provide a status request signal to a given module in the array of modules if the given module is assigned a module address identified by the data acquisition system signal. The given module can provide status data characterizing an operational status of the given module in response to the status request.

Figure 6:
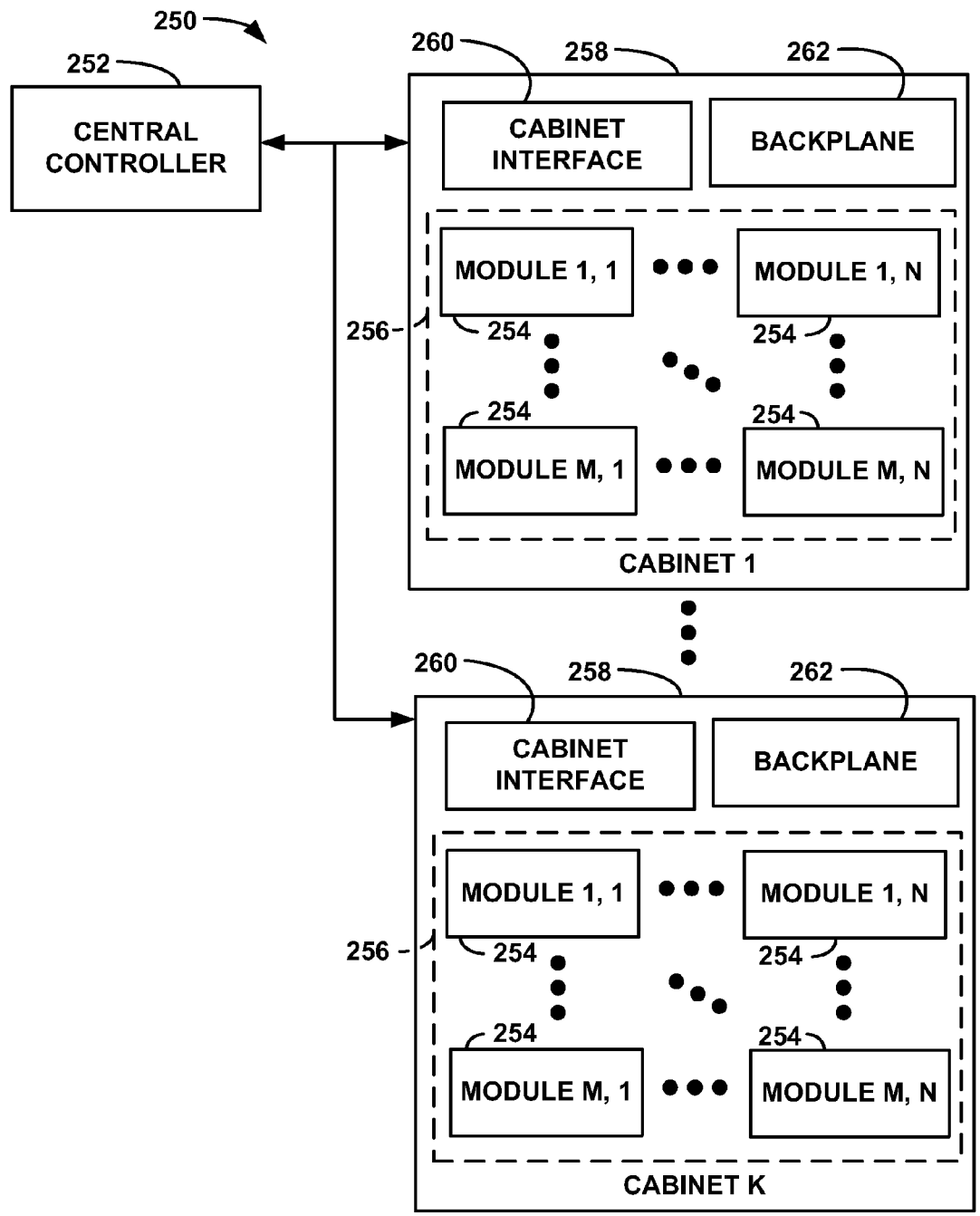
FIG. 6 illustrates yet another example of a data acquisition system.

FIG. 6 illustrates yet another example of a data acquisition system 250. The system 250 can include a central controller 252 to provide a data acquisition system signal for each module 254 in an array of modules 256. It is noted that in the present example, the array of modules 256 extends across an array of K number of cabinets 258. Each data acquisition system signal can include a column address identifying a specific column of modules 254 in the array of modules 256, a row address identifying a specific row of modules 254 in the array of modules 256 and a cabinet address identifying a specific cabinet 258 in an array of cabinets 258. The array of cabinets 258 can receive the data acquisition system signal, each cabinet 258 can have a proper subset of the array of modules 256 installed therein, such that at least two of the modules 254 in the array of modules 256 are assigned an address with the same row and the same column. Moreover, although FIG. 6 illustrates each subset of the array of modules 256 as having M×N number of modules 256, in other examples, each cabinet 258 can be a different number of modules 256 installed therein. A given cabinet 258 in the array of cabinets 258 can include a cabinet interface 260 to provide only the column address and the row address of the data acquisition system signal if the cabinet address of the data acquisition system signal identifies an address assigned to the given cabinet 258. A backplane 262 of the given cabinet 258 can be connected to each module 254 in the proper subset of the array of modules 256 installed in the given cabinet 258. The backplane 262 can receive the column address and the row address of the data acquisition system signal. The backplane 262 can also provide a status request signal to a given module 254 in the proper subset of modules of the array of modules 256 installed in the given cabinet 258 if the given module 254 is assigned a module address identified by the column address and the row address of the data acquisition system signal. The given module 254 can provide status data characterizing an operational status of the given module 254 in response to the status request.

FIG. 7 illustrates still yet another example of a data acquisition system 300. The data acquisition system 300 can include a central controller 302 to provide a data acquisition system signal to each module 304 in an array of modules 306. In the present example, the array of modules 306 extends across an array of cabinets 308. Each data acquisition system signal can include a module address identifying a given module 304 in the array of modules 306. A ribbon cable 310 can connect the central controller 302 to each cabinet in the array of cabinets 308. The ribbon cable 310 can have J number of conductors, where J is an integer greater than 1. The array of cabinets 308 can receive the data acquisition system signal via the ribbon cable 310. Each cabinet 310 can have a proper subset of the array of modules 306 installed therein. Moreover, in FIG. 7 each cabinet 310 is depicted as having M×N number of modules 304 installed therein, in other examples, different cabinets 310 can each have different numbers of modules 304 installed therein. Each cabinet 310 can include a backplane 312 connected to each module 304 in the proper subset of the array of modules 306 installed in the given cabinet 308. The backplane can provide a status request signal to the given module 304 in the array of modules 306 if the given module 308 is installed in the given cabinet 308. The given module 304 can provide status data characterizing an operational status of the given module 304 in response to the status request.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A data acquisition system comprising:
   a central controller to provide a data acquisition system signal, the data acquisition system signal comprising a column address and a row address;
   a given cabinet to receive the data acquisition system signal, the given cabinet having given array of modules installed therein, the given cabinet comprising:
      backplane connected to each module of the given array of modules, the backplane to provide a status request signal to a given module in the given array of modules if the given module is assigned a module address identified by the data acquisition system signal, wherein the given module is to provide status data characterizing an operational status of the given module in response to the status request; and
   another cabinet to receive the data acquisition system signal, the another cabinet having another array of modules installed therein, the another cabinet comprising:
      a backplane connected to each of the another array of modules, the backplane to provide a status request signal to another module of the another array of modules if the another module is assigned a module address identified by the data acquisition system signal, wherein the another module is to provide status data characterizing an operational status of the another module in response to the status request
   wherein the central controller, the given cabinet and the another cabinet are connected by a ribbon cable;
   wherein the data acquisition system signal comprises a cabinet address and wherein each of the given and the another cabinet comprises a cabinet interface to provide only the column address and the row address of the data acquisition system signal to the cabinet backplane if the cabinet address identified in the data acquisition system signal matches a cabinet address assigned to a respective cabinet.

2. The data acquisition system of claim 1, wherein the backplane of the given cabinet comprises a plurality of dip switches to assign a module address to each module in the given array of modules.

3. The data acquisition system of claim 1, wherein the given module is a power amplifier module comprising:
   a power amplifier; and
   a power amplifier module controller to:
      determine an operational temperature of the power amplifier;
      determine an operational power of the power amplifier;
      determine a fault status of the power amplifier; and
   provide the status data, wherein the status data characterizes the operational temperature, the operational power and the fault status of the power amplifier.

4. A data acquisition system comprising:
   a central controller to provide a data acquisition system signal, the data acquisition system signal comprising a column address and a row address; and
   a cabinet to receive the data acquisition system signal, the cabinet having an array of modules installed therein, the cabinet comprising:
      a backplane connected to each module of the array of modules, the backplane to provide a status request signal to a given module in the array of modules if the given module is assigned a module address identified by the data acquisition system signal, wherein the given module is to provide status data characterizing an operational status of the given module in response to the status request; wherein the data acquisition system signal further comprises a power amplifier selector signal and wherein the given module is a power amplifier module comprising:
         a plurality of power amplifiers; and
         a power amplifier module controller to:
            determine an operational temperature of a power amplifier identified in the power amplifier selector signal;
            determine an operational power of the power amplifier identified in the power amplifier selector signal;
            determine a fault status of the power amplifier identified in the power amplifier selector signal; and
            provide the status data, Wherein the status data characterizes the operational temperature, the operational power and the fault status of the power amplifier.

5. The data acquisition system of claim 1, wherein the central controller is further to:
   provide the data acquisition system signal for each of the modules in the given array of modules and the other array of modules in a sequential order; and
   receive the status data from each of the modules in the given array of modules and the other array of modules in the sequential order.

6. The data acquisition system of claim 5, wherein the central controller is further to analyze the status data from each of the modules in the given array of modules and the other array of modules to facilitate a generation of a graphical user interface (GUI) and/or an alpha numeric display that characterizes an operational state of each of the modules in given array of modules and the other array of modules.

7. The data acquisition system of claim 5, wherein the central controller is to receive the status data from each of the modules in the given array of modules and the other array of modules over a common group of conductors in a ribbon cable connecting the central controller to the given cabinet and the other cabinet.

8. The data acquisition system of claim 7, wherein the column address and the row address of the data acquisition system signal correspond to a physical location in the given cabinet and the other cabinet.

9. The data acquisition system of claim 8, wherein the central controller is to provide the data acquisition system signal for up to 256 different modules.

10. A data acquisition system comprising:
    a central controller to provide a data acquisition system signal for each module in an array of modules, each data acquisition system signal comprising:
       a column address identifying a specific column of modules in the array of modules; and
       a row address identifying a specific row of modules in the array of modules;
       a cabinet address identifying a specific cabinet in an array of cabinets;
    the array of cabinets to receive the data acquisition system signal, each cabinet having a proper subset of the array of modules installed therein, such that at least two of the modules in the array of modules are assigned an address with the same row and the same column, a given cabinet in the array of cabinets comprising:
a cabinet interface to provide only the column address and the row address of the data acquisition system signal if the cabinet address of the data acquisition system signal identifies an address assigned to the given cabinet;
a backplane connected to each module in the proper subset of the array of modules installed in the given cabinet, the backplane to:
receive the column address and the row address of the data acquisition system signal; and
provide a status request signal to a given module in the proper subset of modules of the array of modules installed in the given cabinet if the given module is assigned a module address identified by the column address and the row address of the data acquisition system signal, wherein the given module is to provide status data characterizing an operational status of the given module in response to the status request.

11. The data acquisition system of claim 10, wherein the central controller is connected to the array of cabinets through a ribbon cable.

12. The data acquisition system of claim 11, wherein the central controller is to receive the status data from each of the modules in the array of modules over a common group of conductors in the ribbon cable.

13. The data acquisition system of claim 11, wherein the status data provided by each of module in the array of modules characterizes an operational status of a respective module.

14. The data acquisition system of claim 10, wherein a given module in the array of modules is a power amplifier module to amplify a radio frequency (RF) signal.

15. A data acquisition system comprising:
a central controller to provide a data acquisition system signal to each module in an array of modules, each data acquisition system signal comprising:
a module address identifying a given module in the array of modules;
a cabinet address identifying a particular cabinet in an array of cabinets; and
a ribbon cable to connect the central controller to each cabinet in the array of cabinets;
the array of cabinets to receive the data acquisition system signal via the ribbon cable, each cabinet having a proper subset of the array of modules installed therein, a given cabinet in the array of cabinets comprising:
a backplane connected to each module in the proper subset of the array of modules installed in the given cabinet, the backplane to:
provide a status request signal to the given module in the array of modules if the given module is installed in the given cabinet, wherein the given module is to provide status data characterizing an operational status of the given module in response to the status request; and
cabinet interface to provide only the column address and the row address of the data acquisition system signal to the cabinet backplane if the cabinet address identified in the data acquisition matches a cabinet address assigned to the given cabinet.

16. The data acquisition system of claim 15, wherein the central controller is to receive the status data from each of the modules in the array of modules via a common group of conductors in the ribbon cable.

17. The data acquisition system of claim 15, wherein the central controller is to provide control signal to the given module in the array of modules, wherein the given module is configured to execute a command in response to the control signal.

18. The data acquisition system of claim 15, wherein the central controller is assigned a module address that is different from a module address assigned to each of the modules in the array of modules.

* * * * *